United States Patent [19]
Hildebolt et al.

[11] 4,200,041
[45] Apr. 29, 1980

[54] PROTEIN TEXTURIZATION BY STEAM INJECTION

[75] Inventors: William M. Hildebolt, Mickleton; Murray T. Hundt, Maple Shade; Robert E. Small, Voorhees, all of N.J.

[73] Assignee: Campbell Soup Company, Camden, N.J.

[21] Appl. No.: 794,813

[22] Filed: May 9, 1977

Related U.S. Application Data

[62] Division of Ser. No. 645,556, Dec. 31, 1975, Pat. No. 4,038,432.

[51] Int. Cl.² .................................................. A23J 1/00
[52] U.S. Cl. .......................................... 99/483; 99/516
[58] Field of Search ........................ 99/348, 352–355, 99/450.1, 483, 516, 534, 536; 426/507, 511, 656, 802; 425/4, 6, 7, 72 R, 308, 310, 324.1, 326.1, 381; 264/202

[56] References Cited

U.S. PATENT DOCUMENTS

| | | | |
|---|---|---|---|
| 3,661,071 | 5/1972 | Toei et al. | 99/323.4 |
| 3,744,398 | 5/1973 | Liepa | 99/323.4 |
| 3,778,522 | 12/1973 | Stommer | 426/511 |
| 3,914,455 | 10/1975 | Valentas | 426/457 |

*Primary Examiner*—Harvey C. Hornsby
*Assistant Examiner*—Timothy F. Simone
*Attorney, Agent, or Firm*—Schuyler, Birch, McKie & Beckett

[57] ABSTRACT

A bland protein product comprising large diceable chunks of texturized protein having a texture and mouth feel simulating animal meat is prepared by forming an aqueous slurry containing 40 to 50% of a protein material having a protein content of at least 70% on a solids basis, injecting steam into the slurry to propel it through a cooking tube containing a restriction means, passing the protein material through a pressure letdown pump at the discharge end of the cooking tube, and recovering the textured product in a collection zone. The injection steam pressure is chosen to maintain a product temperature of 310° to 350° F. and a back pressure of about 60 to 80 psi in the cooking tube. The protein material also may be subjected to further texturizing treatments after the pressure letdown pump. The process is particularly useful in the co-texturization of meat and vegetable protein mixtures. Apparatus for performing this process is also disclosed.

5 Claims, 16 Drawing Figures

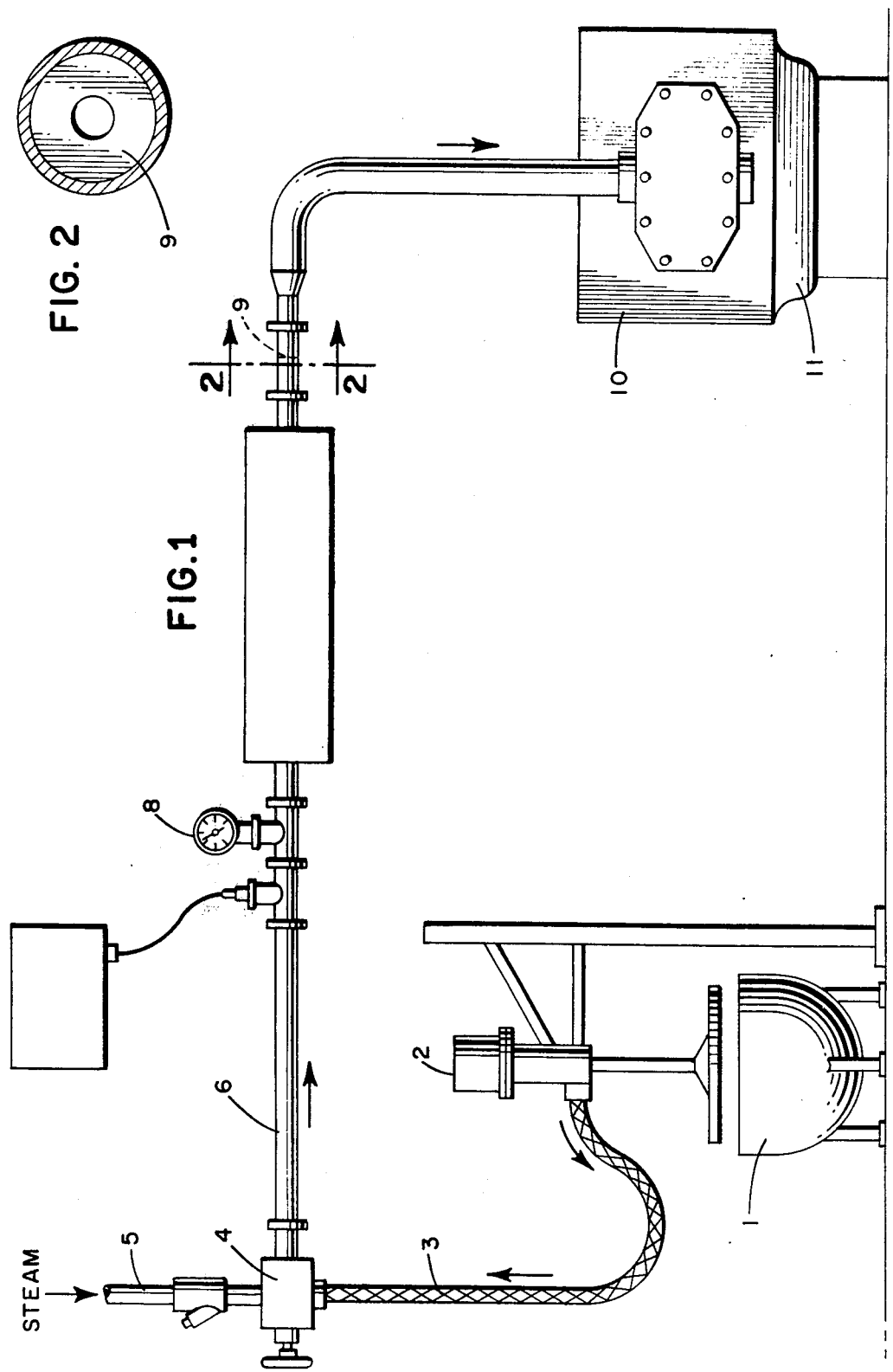

PROTEIN TEXTURIZATION BY STEAM INJECTION

This is a division, of application Ser. No. 645,556, filed Dec. 31, 1975, U.S. Pat. No. 4,038,432.

BACKGROUND OF THE INVENTION

1. Field of the Invention

This invention relates to the treatment of untextured protein materials to form a product possessing the fibrous texture and mouth feel properties of animal meat.

2. Description of the Prior Art

The food industry has spent much effort over a span of many years and has expended large sums of money in an attempt to utilize non-meat proteins, such as those derived from vegetables, as additives to or substitutes for animal meat products. It long has been recognized that the ever-increasing worldwide food shortage could be in material part obviated if only such relatively inexpensive materials could be converted into products so closely approximating the naturally occurring food material that public acceptance would be achieved. One of the major roadblocks encountered by the industry has been the inability to impart the natural and accustomed chewy, fibrous texture to vegetable protein materials. Animal meat products inherently possess a texture giving them a definite "mouth feel" which is clearly recognized and strongly preferred. Vegetable proteins in their natural state generally take the form of amorphous powders which, despite their unquestioned nutritive value, possess mouth feel characteristics wholly unacceptable to the consumer as a meat substitute. Moreover, vegetable proteins normally are characterized by objectionable "beany" flavors which the industry has been unable to remove or mask.

In recent years a number of processes and apparatus have been developed for treating vegetable protein material to produce a bland texturized product. None of these processes, however, has achieved any substantive measure of commercial success.

The first generation of these prior art techniques involved the wet spinning process disclosed in Boyer, U.S. Pat. No. 2,730,447. This process produces a fibrous product by extruding a plurality of fine streams of an aqueous solution of protein into a chemical coagulating bath. The protein coagulates into fine fibers which are collected together and treated to form an edible textured protein product. The wet spinning process suffers from a number of drawbacks in addition to its general failure to produce an adequately textured product as discussed above. The equipment employed to perform this process is extremely sophisticated for the food industry and represents a very high initial cost problem. Adding further to the economic infeasibility of the product produced by the wet spinning process is the expensive starting materials which must be employed. Moreover, product uniformity is difficult to achieve due to the general complexity of the process and the numerous parameter control problems presented.

The second generation technique advanced in this area is the extrusion cooking process disclosed in Atkinson, U.S. Pat. No. 3,488,770, in which a protein mass is physically worked at an elevated temperature and thereafter extruded at an elevated temperature and pressure through an orifice into a medium of lower pressure and temperature. This process also suffers from high equipment costs. In addition, the product produced by extrusion cooking has a very low density which swells up in water to give a "spongy" texture. Moreover, the product contains objectionable flavor notes in addition to the "beany" flavor originally present in the starting materials which are apparently imparted to the product by the processing steps.

The third generation of development in the protein texturization involves the use of steam as the texturizing medium. Exemplary of this approach are Strommer, U.S. Pat. Nos. 3,754,926 and 3,863,019 which treat either finely divided protein particles or slurries with steam and Heusdens U.S. Pat. No. Re. 28,091 which employs a steam treatment of a protein slurry following complex hydration steps. Products produced by these processes also possess the general problems of poor texture and flavor discussed above. In addition, the product has low density problems similar to the second generation extrusion cooked products in that upon addition of water they tend to be very soft. The product is also extremely friable.

Other attempted solutions by the art include the cooking and shaping of a protein dough disclosed in McAnelly, U.S. Pat. No. 3,142,571, and the heat coagulation of undenatured protein disclosed in Rusoff, U.S. Pat. No. Re. 27,790.

Notwithstanding the veritable plethora of prior art attempts to satisfactorily texturize vegetable proteins—no one to date has made any really substantial progress toward the desired goal. The present absence from the market of any commercially accepted consumer products based on vegetable protein demonstrates clearly that the problems involved simply have not been solved. Indeed, those meat analog products which have found their way to the supermarket shelves generally have been met with little or no consumer acceptance and have generally been withdrawn. Especially in the United States, where consumer preferences rather than nutritional values often dictate the fate of food products, a successful texturized vegetable protein material simply must possess taste and mouth feel characteristics similar to natural meat. In addition, the prior art processes generally have employed such complex apparatus and procedures that initial equipment and operating costs have made protein analog products economically unattractive to manufacturers, despite the relatively inexpensive nature of the raw product.

Given the ever-increasing fears of worldwide famine and the diminishing availability of animal meat protein products, it is clear that an inexpensive, consumer-acceptable, high protein food product based on texturized vegetable proteins is urgently needed.

BRIEF SUMMARY OF THE INVENTION

It is the general object of the present invention to provide a process and apparatus for texturizing protein which fulfills the need left unsatisfied by texturizing processes disclosed in the prior art.

More specifically, it is an object of the present invention to provide a process and apparatus for producing large diceable chuncks of protein material having a fibrous texture closely simulating that of natural meat.

It is also an object of the present invention to produce large diceable chunks of restructured meat products by co-texturizing blends of meat and vegetable proteins.

It is a further object of the present invention to provide a process and apparatus which will produce a bland flavored protein product, thus obviating consumer rejection based on the natural flavor of vegetable protein substitutes.

Yet another object of the present invention is to provide a process and apparatus which will produce a retort stable protein product.

It is also an object of this invention to provide a texturizing process and apparatus which will produce a high quality product at a much lower cost due to lower equipment and operating costs.

Generally described, the process of the present invention comprises mixing untextured protein material and water to form a slurry, said protein material containing at least 70% protein on a dry weight basis, said slurry containing about 40 to 50% solids; injecting a heated gas flow into said slurry to propel the protein material into and through a confined treating zone, the temperature in said confined zone being maintained in the range of about 310° to about 350° F., whereby said protein material is rendered to a thermoplastic state; passing the mixture of heated gas and thermoplastic protein material out of the confined treating zone through a pressure letdown means, said pressure letdown means allowing large chunks of thermoplastic protein material to be gently removed from said confined zone while simultaneously maintaining a pressure in said zone of from about 60 to 80 psi; and recovering the texturized protein product in a collection zone.

The present invention further comprises apparatus for texturizing protein which comprises means for mixing a source of protein and water to form a slurry; means for advancing said slurry to an injection zone; means for injecting a gas flow into said slurry in said injection zone; means defining a confined treating zone communicating with said injection zone, whereby said gas flow propels said slurry into and through said confined treating zone; pressure letdown means positioned at the discharge end of said confined treating zone, said pressure letdown means allowing large chunks of thermoplastic protein material to be gently removed from said confined zone while simultaneously maintaining a predetermined back pressure in said confined zone; means for restricting the flow of thermoplastic protein material, said restriction means effecting a stretching and agglomeration of said protein material; and means for recovering said protein material in a collection zone.

BRIEF SUMMARY OF THE DRAWINGS

FIG. 1 represents a schematic of one embodiment of the protein texturizing apparatus of the present invention.

FIG. 2 is a sectional view taken along line 2—2 showing a preferred form of the rstriction means.

DETAILED DESCRIPTION OF THE INVENTION

Figure 3A:
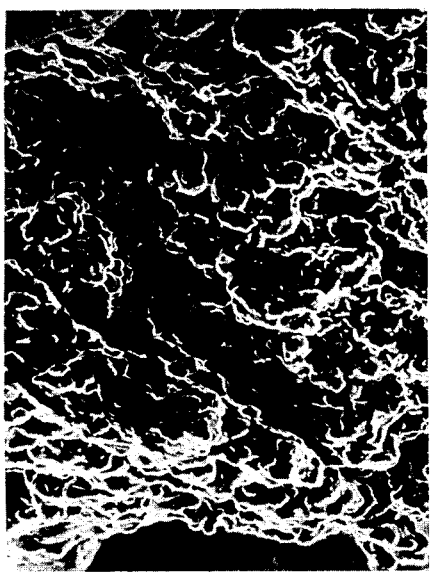
FIG. 3 is a series of photomicrographs showing raw untextured soy protein; 3a is taken at 50×; 3b at 300×; 3c at 500×; and 3d at 1500×.
Figure 3B:
Figure 3C:
Figure 3D:
Figure 4A:
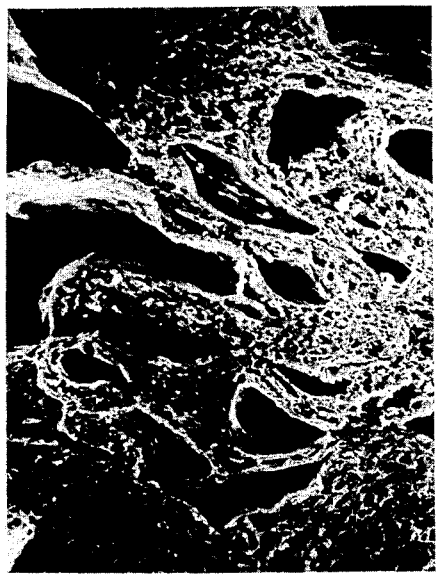
FIG. 4 is a series of photomicrographs showing the texturized soy protein product produced by the present invention; 4a is taken at 50×; 4b at 300×; 4c at 500×; and 4d at 1500×.
Figure 4B:
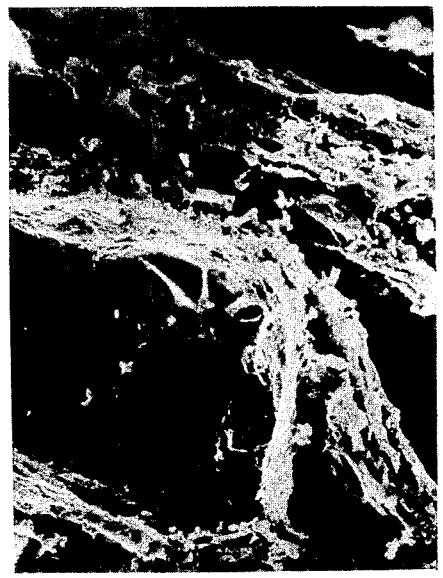
Figure 4C:
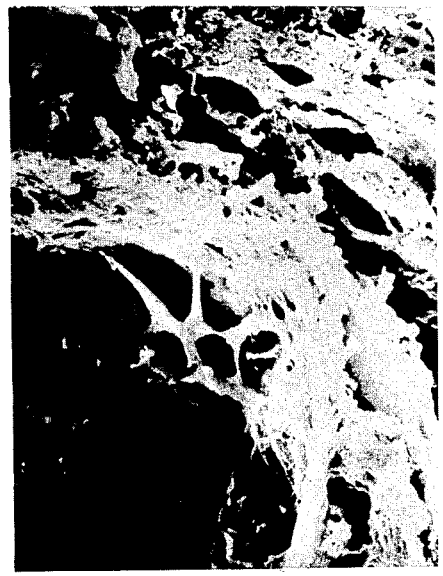
Figure 4D:
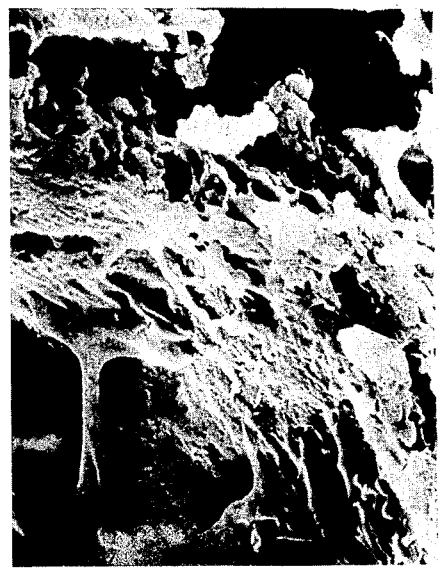
Figure 5A:
FIG. 5 is a series of photomicrographs showing a textured mixture of soy protein and mechanically deboned chicken meat according to the present invention; 5a is taken at 50×; 5b at 300×; 5c at 500×; and 5d at 1500×.
Figure 5B:
Figure 5C:
Figure 5D:

The present invention is directed to a process and apparatus for texturizing protein material. The term texturizing as used herein and widely understood in the art refers to the process of changing globular, amorphous protein as seen in FIG. 3 into fibrous continuous phase protein material.

The term retort stable as used herein refers to a product which keeps its structural integrity after treatment at elevated temperature and pressure. In the typical retort processing test about 1 part texturized protein is mixed with 10 parts of a 1% salt solution and sealed in a can. The can then is placed in a retort and subjected to a temperature of 250° F. and a pressure of 15 psig for about 60 minutes. The ability of a retorted product to maintain its structural integrity and bite characteristics can be tested by placing the product between the thumb and forefinger and subjecting the product to shear forces. A retort stable product will not disintegrate with moderate finger pressure. A product with poor retort stability will feel mushy and will fall apart when subjected to moderate shear forces.

The protein material employed in the process of the present invention must contain at least 70% protein on a solids basis to achieve a product possessing the requisite texture and mouth feel. Of primary interest are vegetable protein materials derived from soybeans. The soy protein can take the form of soy flour, soy concentrate, soy isolates, or mixtures thereof, which meet the minimum 70% protein requirement. In one preferred embodiment the protein material comprises a mixture of from about 50 to 60% soy flour and from about 40 to 50% soy isolate. Other oilseed materials such as peanut, cottonseed, and sesame seed may also be employed. Other known protein materials such as those derived from wheat, milk, egg, single cell or leaf proteins and the like may be texturized according to the process of the present invention. The protein material employed should be viable, i.e., have a PDI (protein dispersability index) in the range of from 50 to about 90%.

The process and apparatus of the present invention is particularly well suited to the restructuring of meat products by co-texturization of meat protein material with a non-meat protein binder. Meat proteins may comprise meat scraps or pieces possessing poor textural qualities such as mechanically deboned chicken, beef, seafood, and the like or desired blends. Suitable protein binders include vegetable proteins such as soy protein or other known proteins such as those derived from wheat, single cell, leaf, milk, egg, and the like. In general, mixtures containing up to about 80% comminuted meat may be co-texturized according to the process of the present invention. For most applications, mixtures containing from about 50 to about 75% meat provide the best results. It is only necessary that the meat-containing blend have at least 70% total protein on a solids basis.

In accordance with the process of the present invention the protein material above described initially is mixed with water to form a dough-like proteinaceous slurry. This slurry should contain about 40 to 50% solids. If desired a pumping aid such as, for example, sodium bisulfite, may be employed to reduce the viscosity of the slurry. The slurry is advanced to a steam injection zone by a feed pump. The slurry feed rate will depend on the capacities of the particular apparatus employed. In pilot plant size apparatus, rates of about 6 to 15 pounds per minute have been employed, whereas in production applications, rates of from about 20 up to 50 pounds per minute or more may be employed. High pressure steam then is injected directly into the protein slurry in the injection zone. The high steam pressure and resulting turbulence insures rapid and uniform heat transfer to the protein slurry. The steam pressure should be sufficiently high to overcome the pressure of the slurry from the pump and to propel the slurry out of the steam injection zone. Pressures in the range of about 80 to about 150 psi have been found suitable to achieve this result. Best results are obtained when the steam injection pressure is in the range of about 110 to about 120 psi.

The high pressure steam flow leaving the injection zone propels the protein slurry into a confined treating zone. A predetermined elevated temperature and pressure are maintained in the treating zone to convert the protein to a thermoplastic state. The protein product should be held under pressure in the confined treating zone until a temperature of about 310° to 350° F. is reached. Temperatures in the range of 325° to about 330° F. are preferred. The residence time in the confined treating zone is not critical and may range from a few seconds up to one or two minutes. Residence time values may be controlled by varying the slurry feed rate and the length of the zone.

At the discharge end of the treating zone is a pressure letdown means. The pressure letdown means operates to maintain a back pressure of from about 60 to about 80 psi in the confined treating zone while providing an outlet from the zone through which the protein material and steam may pass. The letdown means should be chosen so as to gently effect the transfer of the thermoplastic protein material out of the confined zone environment.

At some point while the protein material is still in thermoplastic form, the protein material is passed through a restriction means. The restriction means serves to agglomerate and stretch the thermoplastic protein material which contributes both to the overall large chunky size of the product and to the internal fibrous structural characteristics the product possesses. In the preferred embodiment this restriction means takes the form of an orifice restriction immediately upstream of the pressure letdown means.

After passing through the pressure letdown means the steam-protein mixture may be recovered in a collection zone in the known manner and will be characterized by enhanced characteristics.

In another embodiment of the present invention, the product characteristics are further enhanced by subjecting the protein material issuing from the pressure letdown means to additional mechanical working. By subjecting the protein to stretching and shear the internal structural properties of the product can be modified to more closely represent the texture of natural meat products. Any type of working process which imparts stretching and/or generates shear forces on the protein material may be employed in accordance with the present invention. Preferably these additional working steps are also employed to convert the overall product shape to one suitable for other food applications. For example, in one embodiment the protein material can be fed directly to a pair of cold rolls which form the protein into a sheet like product. This sheeting process produces a flaky, laminated product which simulates the texture of certain meat products such as tuna fish. In another embodiment the texturized protein may be fed directly into a screw conveyor where it is subjected to work forces. This screw conveyor can be used to force the worked product through any kind of forming device, such as an extrusion die to provide a final product shape suitable for the direct manufacture of meat analog products. Post extrusion temperatures in the range of about 250° to 320° F. may be employed.

One embodiment of the apparatus of the present invention now will be described by reference to FIG. 1. The slurry of water and protein to be texturized is formed in any suitable mixing means 1 such as a Hobart mixing bowl. Discharge from the mixing means is forwarded by a feeding means 2 through a feed line 3 to a steam injection zone 4. The feeding means can be any device capable of advancing a relatively high consistency slurry. Especially well suited for this application is the "Monark Shovel," a piston type transfer pump sold by Graco, Inc., of W. Caldwell, N.J.

Steam injection zone 4 comprises a mixing valve assembly in which the protein slurry from the feed line and high pressure steam are mixed. Any valve assembly can be employed which effects a rapid and intimate mixture of steam and protein slurry without clogging. One suitable valve is the Schutte and Koerting Model #320 1¼" NPT. Steam enters the injection zone via inlet line 5. The injection zone is in communication with a confined treatment zone 6. In the preferred embodiment the treatment zone comprises an elongated cylindrical chamber or "cooking tube." The dimensions of this chamber are not critical. The cooking tube should be long enough to achieve good fluidization of the protein and to achieve good heat transfer from the steam. In practice, lengths of from 7 to 13 feet have been satisfactorily employed. The diameter should be large enough to prevent clogging and small enough to facilitate the maintenance of proper pressure conditions with available steam. Diameters in the range of about 1¼" to about 6" have been found to satisfy these conditions although a maximum 3" is preferred. The cooking chamber may be provided with temperature sensing element 7, and a discharge pressure gauge 8. In the embodiment shown in FIG. 1, a restriction means 9 is positioned near the end of the cooking tube. In the preferred embodiment this restriction means comprises an orifice restriction, i.e., a washer-like obstruction in the flow path which effects a reduction in the cross section of the tube for a very short distance. This feature of the invention is illustrated in FIG. 2. By way of example, a washer-like restriction means employed in a 1½" diameter cooking tube has successfully utilized an orifice diameter of from about 7/16 to 13/16". Generally the limiting factors will be plugging which in turn depends on the slurry feed rate, and pressure drop considerations. In general suitable washer thicknesses are on the order of 1/16". Other forms of restriction means may be employed so long as they serve to agglomerate and stretch the thermoplastic protein material as it passes through the restriction.

At the discharge end of the cooking tube is a pressure let down means 10. The prior art texturizing apparatus has employed various means such as spring loaded valves and venturi restrictions to effect the discharge of protein from the cooking tube. Some prior art processes expel the product directly to the atmosphere without any pressure maintaining means. The present invention is predicated at least in part on the discovery that the type back pressure maintaining means has great influence on the final product characteristics. In the process and apparatus of the present invention, the protein is discharged from the cooking tube by special pressure letdown means which gently removes the product from the tube environment while maintaining the requisite back pressure in the tube. In contrast to the violent expulsion present in most prior art processes, the protein is transferred gently, i.e., without great turbulence, to the recovery zone 11. This pressure letdown means can, for example, comprise a rotary pump such as the CP-6 produced by Creamery Package Company, or the Foster Food Pump Model R2-4PB produced by Foster Pump Works, Inc., or a rotary valve such as that used in lye peelers and air-lock type systems.

The rotary type pumps or valves operate according to well known principles by which the impeller or valve member is movable in such a way as to define, in conjunction with the casing or housing, at least one movable zone which communicates in a first position with the feed inlet and which upon movement to a second position is isolated from the inlet and communicates with the discharge.

Product issuing from the pressure letdown means may be directly collected in a recovery means. Suitable apparatus for this step include a liquid cyclone, a pipe flume conveyor to a Sweco 30" screen, or a Dorr Oliver hydro screen.

Figure 6:
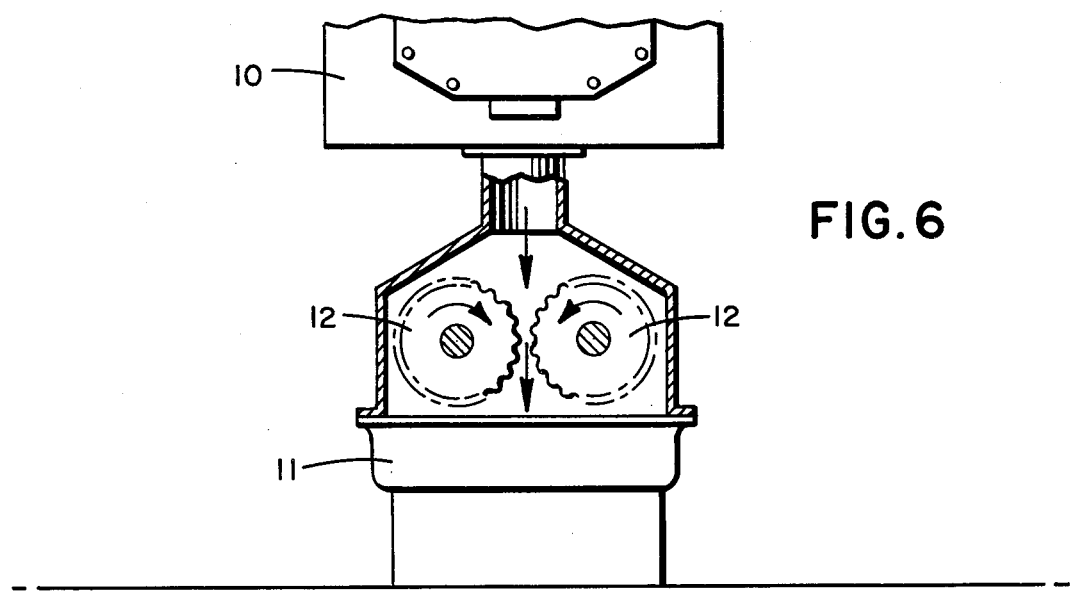
FIG. 6 is a partial schematic showing an alternative embodiment of the protein texturizing apparatus of the present invention.
Figure 7:
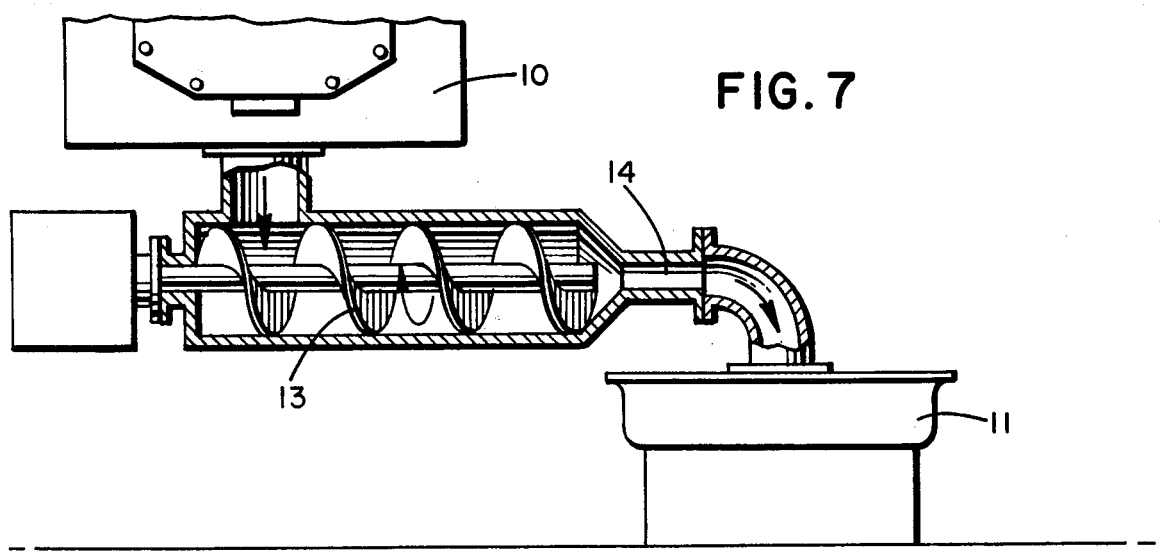
FIG. 7 is a partial schematic showing a further alternative embodiment of the protein texturizing apparatus of the present invention.

Another embodiment of the apparatus of the present invention additionally comprises means for mechanically working the thermoplastic material issuing from the pressure letdown pump. This mechanical working means can comprise any apparatus which subjects the protein material to stretching and shear forces. One suitable mechanical working means shown in FIG. 6 comprises a set of sheeting rolls. A pair of 3" diameter, 6" long corrugated rollers 12 have been successfully employed. Another suitable mechanical work means shown in FIG. 7 comprises a screw feed forming means, such as a tamale extruder or a modified Wenger X-25 cooker extruder having a screw feeder 13 and an extrusion nozzle 14.

The product produced by employing the process parameters and apparatus of the present invention comprises relatively large chunks of fibrous texturized protein material having structural and eating properties similar to animal meat products. Observance of the process parameters of the invention results in a product exhibiting a laminated fibrous striated muscle-like structure which is generally oriented in one direction. In between the laminated layers, the product of the present invention exhibits excellent random cross fiber development, as seen in FIGS. 4 and 5. This textured structure is generally more dense than the prior art products. The textured soy proteins as seen in FIG. 4 possess a very dense matrix with a system of small compressed cells randomly distributed throughout the matrix. This novel structure provides a large number of natural shear points which give way upon chewing to provide bite and mouth feel characteristics which simulate natural meat products.

The product of the present invention also is free from objectionable flavor notes which in themselves often made prior art products unacceptable to humans. Another advantage achieved by the process and apparatus of the present invention lies in the retort stability of the product, i.e., the protein product formed in accordance with this invention may be processed by conventional food preparation techniques without thermal degradation of its physical or organoleptic properties.

Of special importance are the restructured meat products produced according to the process and apparatus of the present invention. This unique product which is a co-texturized blend of meat and vegetable protein has all the structural properties described above and has even greater matrix density as seen in FIG. 5. In addition, this product possesses the further advantage of utilizing raw materials which might otherwise have no utility at all in food intended for human consumption. For example, meat scraps or meat by-products with textural characteristics too poor for use in foodstuffs can be co-texturized in admixture with vegetable proteins in accordance with the process of the present invention to provide diceable chunks of chicken, beef, crabmeat, and the like with excellent texture and mouth feel.

Products produced by the process of the present invention find utility in a number of food processing fields. Unlike the prior art products presently on the market, the product produced according to the present invention consists of large diceable chunks of protein material having good internal fibrous structure. The prior art products generally comprise small fibrous protein materials which must be further processed before diceable portions can be obtained. The products of the present invention can be diced as produced and incorporated directly into canned or frozen foods. The fibrous textured protein materials of the present invention also may be combined with suitable binders and adjuvants to provide meat analogs having the appearance, taste, and chewability of animal meat products. The product of the present invention may also be ground and employed as a filler or extender in ground meat products. It is also possible to produce fabricated nutrients from the protein material produced according to the present invention.

The following specific examples are intended to illustrate more fully the nature of the present invention without acting as a limitation on its scope.

EXAMPLE 1

Texturized protein material is prepared according to the present invention as follows: 4305 grams of a mixture containing 40% Promine R (a soy protein isolate having a protein content of about 95% and produced by Central Soya Co., Inc.) and 60% Soy Flour 200 W (a soy flour having a protein content of about 50% and produced by Central Soya Co., Inc.) are mixed with enough water to provide a slurry having 40% solids. 20 g of sodium bisulfite is added to reduce the slurry viscosity. The slurry then is texturized in the apparatus shown in FIG. 1.

A Model 3L4 Moyno pump is operated at 36 RPM to feed the slurry to the injection zone which comprises a Schutte & Koerting Model #320 1¼" NPT mixing valve. Steam is injected at a pressure of 110 psi and this serves to propel the slurry into a 13' long cooking tube having a 1½" diameter. In this apparatus the injected steam velocity is in the range of about 50' per second. Positioned near the discharge end of the tube is a washer type restriction means having a 9/16" orifice. The temperature in the tube is maintained at about 325° F., and the back pressure is about 80 psi. At the discharge end of the tube is a pressure letdown pump—a model CP-6 made by Creamery Package Co., Inc. The product issuing from the letdown pump consists of extremely large chunks with good internal texturization.

EXAMPLE 2

This example demonstrates the applicability of the process and apparatus of the present invention to co-texturizing a mixture of meat and vegetable protein. A proteinaceous mixture of 50% Promine R and 50% chicken meat is formulated. The chicken meat is 50% raw mechanically deboned chicken and 50% ground hand deboned chicken parts. A 45% solids slurry is formed by the addition of water and 2% (based on meat) of salt. The salt is included when texturing mixtures containing animal protein to enhance the extraction of actomyosin and thereby obtain a better binding reaction during texturization. This slurry is texturized as in Example 1, except that the Moyno pump is replaced by the Graco pump described previously, the cooking tube temperature is at 320°–325° F. and the pressure at the letdown pump is at 70 to 80 psi. The product consisting of large chunks is collected dry and cooled to 60° F. and diced into 5/16"×⅜"×⅜" cubes. Upon retort processing the diced product demonstrates good color, flavor, and texture.

EXAMPLE 3

This example demonstrates the applicability of the process and apparatus of the present invention to texturizing mixtures of vegetable protein and shrimp meat to form shrimp piece analogs. A protein mixture of 40% Promine R and 60% raw ground shrimp is mixed with water and 2% (based on shrimp) salt to form a slurry having 40% solids. This slurry is texturized as in Example 2. The resulting product is generally white in appearance with typical shrimp like red splotches throughout. The texturized pieces are diced to ⅜"×⅜"×¼" and subjected to retort processing. The retorted product exhibits excellent flavor, texture and appearance.

EXAMPLE 4

This example demonstrates the fabrication of a ham-like meat analog according to the process of the present invention. A protein mixture of 50% Promine R and 50% soy flour is slurried with water to a solids content of 40%. A small quantity of Red dye No. 40 is included in the formulation. The slurry then is texturized as in Example 2 to produce large chunks (3"×3"×6") of textured product. The chunks are diced to ⅜"×⅜"×¼" and frozen for later use. This product exhibits good ham-like color and texture.

EXAMPLE 5

This example demonstrates the use of a mechanical working treatment after the pressure letdown pump in accordance with one embodiment of the present invention. The protein formulation comprising 70% Promine R and 30% mechanically deboned chicken meat is slurried with water and 2% (based on meat) salt to a solids content of 40%. The slurry is texturized in the manner of Example 2 except that the product issuing from the pressure letdown pump is fed directly to a pair of 3-inch diameter corrugated sheetings rolls with a clearance of 0.125". The product is a sheet of protein product having a flaky laminar texture. This sheet is diced and subjected to retort processing. The product is extremely stable and shows excellent flavor, color, and texture.

EXAMPLE 6

This example demonstrates the importance of employing a pressure letdown means in achieving a texturized product. A mixture of 50% Promine R and 50% Soy Flour (200 W) is slurried with water to give 40% solids. This slurry is fed to the apparatus of FIG. 1 which is modified by removing the letdown pump. The steam supply pressure is 110 psi. The product issuing from the cooking tube is gel like in appearance and untextured.

While certain specific embodiments of the invention have been described with particularity herein, it should be recognized that various modifications thereof will occur to those skilled in the art. Therefore, the scope of the invention is to be limited solely by the scope of the claims appended hereto.

We claim:

1. Apparatus for producing texturized protein material comprising:
    (a) means for mixing a source of protein and water to form a slurry;
    (b) means for advancing said slurry to an injection zone;
    (c) means for injecting a heated gas flow into said slurry in said injection zone;
    (d) means defining a confined treating zone communicating with said injection zone, whereby said gas flow propels said slurry into and through said confined treating zone;
    (e) material removal means positioned at the discharge end of said confined treating zone for gently and intermittently isolating and removing discrete quantities of thermoplastic protein material from said confined zone and for simultaneously maintaining a predetermined back pressure in said confined zone, said material removal means comprising means defining at least one movable zone communicating in a first position with the discharge end of said confined treating zone, said movable zone being movable to a second position in which said movable zone is isolated from said confined zone, and in which second position said protein material can be removed from said movable zone;
    (f) means for restricting the flow of thermoplastic protein material in said confined treating zone disposed immediately upstream of said material removal means, said restriction means effecting a stretching and agglomeration of said protein material; and
    (g) means communicating with the outlet of said material removal means for recovering said protein material in a collection zone.

2. The apparatus of claim 1 wherein said material removal means comprises a rotary type pump.

3. The apparatus of claim 1 additionally comprising means for mechanically working said thermoplastic protein material issuing from said material removal means.

4. The apparatus of claim 3 wherein said mechanical working means comprises a set of sheeting rolls.

5. The apparatus of claim 3 wherein said mechanical working means comprises a screw feed forming means.

* * * * *